US011128815B2

(12) United States Patent
Jeong et al.

(10) Patent No.: US 11,128,815 B2
(45) Date of Patent: Sep. 21, 2021

(54) DEVICE, METHOD AND COMPUTER PROGRAM FOR EXTRACTING OBJECT FROM VIDEO

(71) Applicant: KT CORPORATION, Seongnam-si (KR)

(72) Inventors: Yeong Hwan Jeong, Yongin-si (KR); Jae Won Choi, Seoul (KR); Kang Tae Lee, Goyang-si (KR)

(73) Assignee: KT CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/070,184

(22) Filed: Oct. 14, 2020

(65) Prior Publication Data
US 2021/0112208 A1    Apr. 15, 2021

(30) Foreign Application Priority Data
Oct. 14, 2019   (KR) .................. 10-2019-0126993

(51) Int. Cl.
| *H04N 9/80* | (2006.01) |
| *H04N 5/77* | (2006.01) |
| *H04N 5/93* | (2006.01) |
| *G11B 27/00* | (2006.01) |
| *H04N 5/262* | (2006.01) |
| *G06K 9/00* | (2006.01) |
| *H04N 21/854* | (2011.01) |
| *H04N 5/225* | (2006.01) |
| *H04N 5/228* | (2006.01) |
| *H04N 3/20* | (2006.01) |

(52) U.S. Cl.
CPC ....... *H04N 5/2628* (2013.01); *G06K 9/00744* (2013.01); *G06K 9/00765* (2013.01); *H04N 21/854* (2013.01)

(58) Field of Classification Search
USPC ..... 348/169, 208.14, 207.99, 170, 171, 172; 386/228, 248, 239, 280
See application file for complete search history.

(56) References Cited

U.S. PATENT DOCUMENTS

| 8,331,760 B2 * | 12/2012 | Butcher | ............. H04N 21/8547 386/239 |
| 2013/0208134 A1 * | 8/2013 | Hamalainen | ....... H04N 5/23258 348/208.99 |

(Continued)

FOREIGN PATENT DOCUMENTS

| JP | 6328688 B2 | 5/2018 |
| KR | 101116789 B1 | 3/2012 |

*Primary Examiner* — Daquan Zhao
(74) *Attorney, Agent, or Firm* — Hamre, Schumann, Mueller & Larson, P.C.

(57) ABSTRACT

An object extraction device for extracting an object from a video includes a tracking unit that tracks at least one object included in the video; a crop area setting unit that sets an area to be cropped in any one frame of the video based on coordinate information of the tracked object; a crop area movement determination unit that determines whether or not to move the crop area based on a location relation between the coordinate information of the tracked object and the crop area; and an extraction unit that extracts, from the video, a partial video corresponding to the crop area that is moved or not according to a result of the determination.

11 Claims, 18 Drawing Sheets

(56) References Cited

U.S. PATENT DOCUMENTS

| | | | |
|---|---|---|---|
| 2015/0178943 A1* | 6/2015 | Li | H04N 5/232 |
| | | | 382/103 |
| 2016/0057494 A1* | 2/2016 | Hwang | H04N 21/434 |
| | | | 725/133 |
| 2019/0088005 A1* | 3/2019 | Lucas | G06T 7/246 |
| 2020/0007921 A1* | 1/2020 | Ojala | H04N 13/161 |

* cited by examiner

⟨FIRST FRAME⟩ — 320

⟨THIRD FRAME⟩ — 340

DEVICE, METHOD AND COMPUTER PROGRAM FOR EXTRACTING OBJECT FROM VIDEO

CROSS-REFERENCE TO RELATED APPLICATION

This application claims the benefit under 35 USC 119(a) of Korean Patent Application No. 10-2019-0126993, filed on 14 Oct. 2019, in the Korean Intellectual Property Office, the entire disclosures of which are incorporated herein by reference for all purposes.

TECHNICAL FIELD

The present disclosure relates to extracting objects from a video.

BACKGROUND

In general, an individual video service for each subject is offered by taking pictures of the subject with a camera installed on the subject.

The individual video service requires high facility investment. Recently, to technically solve this problem, methods of automatically extracting an individual video of each subject from a high-definition video by using tracking technologies have been proposed.

However, such object extraction methods have two problems as follows.

First, to crop a video, an area to be cropped is determined based on position coordinates of a tracked subject, and, thus, the subject is located right in the middle of each frame. In this case, the angle of view changes with each frame to cause the viewers to feel dizzy and uncomfortable.

Second, if a tracker that tracks a subject causes an error, a video frame jumps to an unpredicted location. As such, if the video frame jumps to a wrong frame, it is difficult to obtain a normal video.

SUMMARY

The technologies described and recited herein include setting an area to be cropped in a frame of a video based on coordinate information of an object tracked in the video, determining whether or not to move the crop area based on a location relation between the coordinate information of the tracked object and the crop area, and extracting a partial video corresponding to the crop area. Problems solved by the present disclosure are not limited to those described above.

According to an exemplary embodiment, an object extraction device for extracting an object from a video may include a tracking unit that tracks at least one object included in the video; a crop area setting unit that sets an area to be cropped in any one frame of the video based on coordinate information of the tracked object; a crop area movement determination unit that determines whether or not to move the crop area based on a location relation between the coordinate information of the tracked object and the crop area; and an extraction unit that extracts, from the video, a partial video corresponding to the crop area that is moved or not according to a result of the determination.

According to another exemplary embodiment, an object extraction method for extracting an object from a video may include a process of tracking at least one object included in the video; a process of setting an area to be cropped in any one frame of the video based on coordinate information of the tracked object; a process of determining whether or not to move the crop area based on a location relation between the coordinate information of the tracked object and the crop area; and a process of extracting, from the video, a partial video corresponding to the crop area that is moved or not according to a result of the determination.

According to another exemplary embodiment, a computer program stored in a medium and including a sequence of instructions for extracting an object from a video, wherein when the computer program is executed by a computing device, the computer program includes a sequence of commands for tracking at least one object included in the video, setting an area to be cropped in any one frame of the video based on coordinate information of the tracked object, determining whether or not to move the crop area based on a location relation between the coordinate information of the tracked object and the crop area, and extracting, from the video, a partial video corresponding to the crop area that is moved or not according to a result of the determination.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the above-described embodiments of the present disclosure, it is possible to set an area to be cropped in a frame of a video based on coordinate information of an object tracked in the video, determine whether or not to move the crop area based on a location relation between the coordinate information of the tracked object and the crop area, and extract a partial video corresponding to the crop area.

Accordingly, unlike a conventional individual video extraction method by which a video is extracted by unnatural camera movements as if it were cropped by a machine, the present disclosure makes it possible to extract a video as if it were taken with a camera by a user himself/herself.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
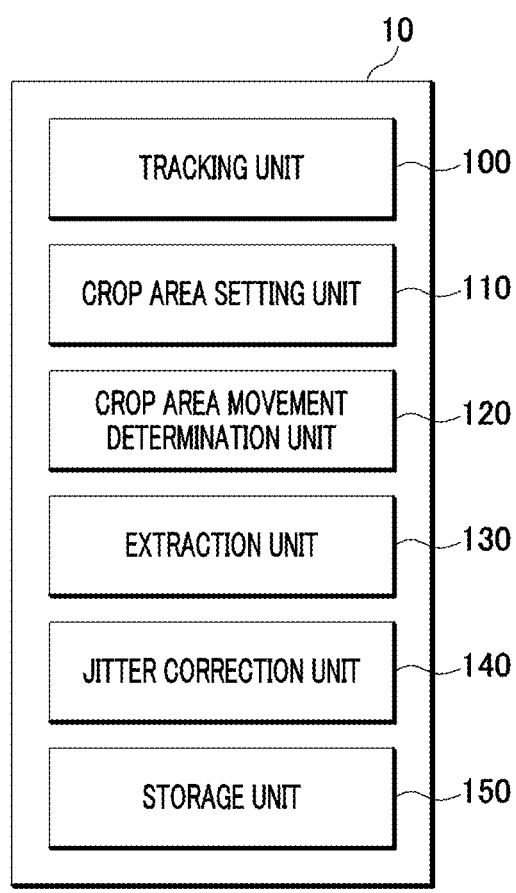
FIG. 1 is a block diagram illustrating an example of an object extraction device, in accordance with various embodiments described herein.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to pertain to a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

As described and recited herein, "unit" may pertain to a unit implemented by hardware and/or a unit implemented by software. As examples only, one unit may be implemented by two or more pieces of hardware or two or more units may be implemented by one piece of hardware.

As described and/or recited herein, an "object" may be regarded as a set of pixels within a frame of a digital video file. The set of pixels (or the object) may be a graphical representation of a discrete entity perceivable by a sighted audience when the corresponding set of pixels are projected onto a display. For example, an object may represent a discrete entity such as a human, an animal, a baseball, a baseball bat, a sign, a door, a window, or the likes. As a non-limiting example provided only for the sake of explanation, a display may be provided as a mobile phone display screen, a television screen, a computer monitor, or the like.

As described and/or recited herein, a "video" may be regarded as a plurality of frames of a stationary image or photo displayed sequentially over a period of time. As a non-limiting example provided only for the sake of explanation, a digital video file may be a digital recording of a sporting event that may be played back at a normal speed of 60 frames per second.

A video may be created by a video capturing device that converts light and color information into one or more image data that may be stored in a computer readable medium in one or more formats suitable for displaying or processing. Examples of such formats may include, but not be limited to, DV. HDV, MPEG-2/4, etc. Further, the video capturing device may be a digital camera, a cell phone camera, etc.

Image files of a video or a picture may be stored in a format suitable for displaying and/or image processing. The image file may be processed frame-by-frame in video processing. The files may be stored in a computer readable medium, for example, a hard drive, a member card, or the like.

As disclosed and/or recited herein, a "frame" may be regarded as a set of pixels. A full frame may be a set of pixels that includes all of the pixels or substantially all of the pixels from a prior image process operation of the digital files or from a video capturing device. A full frame may include a set of pixels arranged in a rectangular or other suitable patterns for display and/or processing.

As described and/or recited herein, "image processing" may be regarded as altering the image data of an image file. A prior processing step may be an image process applied in a prior frame using a current image processing function. Image processing may include digitally altering a portion of an image data frame or the entirety thereof. Image processing may be performed automatically by execution of a program or an algorithm or may be executed manually by an operator aided by an image processing tool or software. Non-limiting, examples of image processing may include cropping of at least a portion of a frame, adjusting color within at least one frame, adjusting brightness within at least one frame, etc.

As described and/or recited herein, "cropping" may regarded as retaining a subset of pixels of a full frame of image data. A cropped area may be pertain to dimensions of the subset of pixels retained after the cropping, expressed in terms of the number of pixels. A cropped area may also include a location of the subset of pixels retained after the cropping. The location may be represented by coordinates of a center of the cropped area, one or more corners of the crop area, etc.

As described and/or recited herein, "setting" may be regarded as determining or selecting an area to be cropped using an algorithm or a set of criteria to determine the dimensions and the location of the area to be cropped.

As described and/or recited herein, "tracking" of an object in a video may be regarded as cropping an image file so that the center of the tracked object is maintained at the center of the cropped area over a predetermined period of time. Tracking may also include maintaining the center of the object at a designated number of pixels from the center of the full frame. The number may vary among different frames and vary according to a method to determining the number.

As described and/or recited herein, "moving" may be regarded as changing a location of the cropped area or changing the dimensions of the cropped area, all within a frame or among a plurality of frames.

As described and/or recited herein, "extracting" a video may be regarded as applying image processing to an image file directly captured from a video capturing device or to an image file that has been previously extracted.

In the present disclosure, some of operations or functions described as being performed by a device may be performed by a server connected to the device. Likewise, some of operations or functions described as being performed by a server may be performed by a device connected to the server.

Hereinafter, the present disclosure will be explained in detail with reference to the accompanying configuration views or process flowcharts.

FIG. 1 is a block diagram illustrating an example of an object extraction device 10, in accordance with various embodiments described herein.

Referring to FIG. 1, the object extraction device 10 may include a tracking unit 100, a crop area setting unit 110, a crop area movement determination unit 120, an extraction unit 130, a jitter correction unit 140 and a storage unit 150. However, the object extraction device 10 illustrated in FIG.

1 is just an embodiment of the present disclosure and may be modified in various ways based on the components illustrated in FIG. 1.

FIG. 2A through FIG. 2D are example display depictions to explain a method for extracting a video based on a first critical area, in accordance with various embodiments described herein. Hereinafter, FIG. 1 will be discussed together with FIG. 2A through FIG. 5C.

The tracking unit 100 may track at least one object included in a video.

Figure 2A:
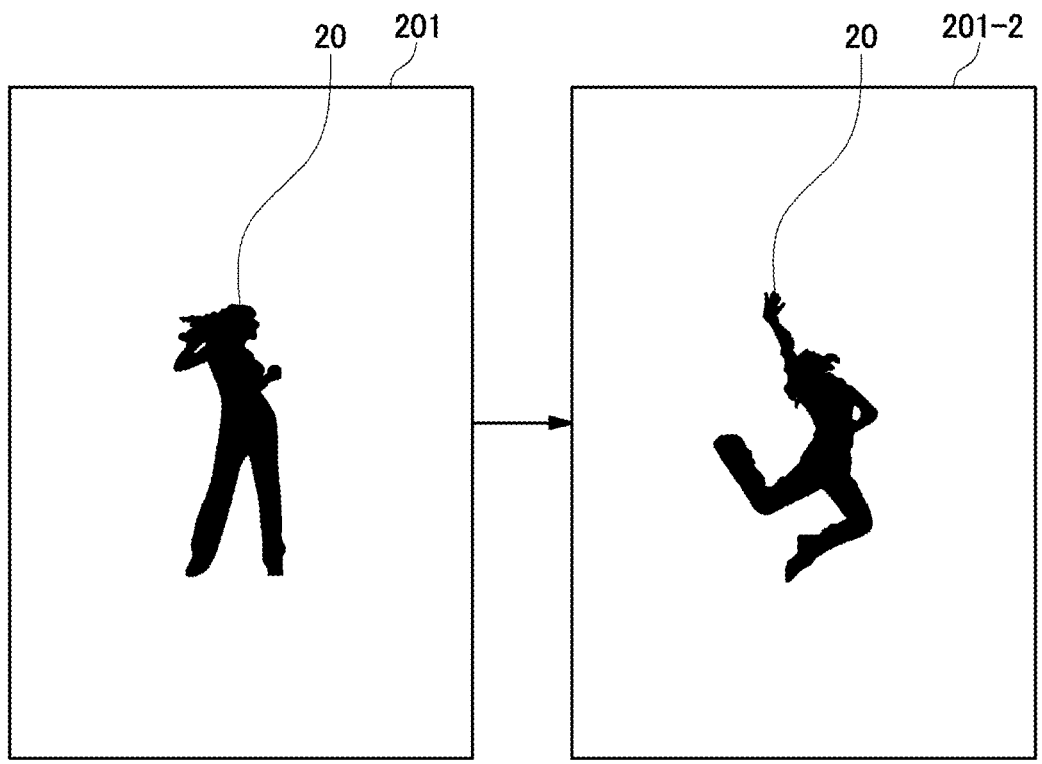
FIG. 2A through FIG. 2D are example display depictions to explain a method for extracting a video based on a first critical area, in accordance with various embodiments described herein.

Referring to FIG. 2A, if coordinate information of an object 20 obtained by tracking the object 20 in a first frame 201 included in the video is used to extract a video including a second frame 201-2 including the object 20, the object 20 is located right in the middle of the extracted video. In this case, the video looks unnatural and may cause the viewer to feel dizzy and uncomfortable.

To solve this problem, an area to be cropped may be set in any frame of the video and a first critical area corresponding to the crop area may be set. A critical area may be a subset of the area to be cropped. The dimensions of the critical area may be expressed in terms of number of pixels, and may be calculated based on the dimensions of the cropped area. The location of the critical area may be expressed by the coordinates of the center of the critical area or one or more corners of the critical area.

Specifically, the crop area setting unit 110 may set an area to be cropped in any frame included in the video based on the coordinate information of the tracked object. For example, the crop area setting unit 110 may set an area to be cropped in the middle of a first frame of the video based on the coordinate information of the tracked object.

The crop area movement determination unit 120 may determine whether not to move the area to be cropped based on a location relation between the coordinate information of the tracked object and the area to be cropped.

If the coordinate information of the tracked object is included in the first critical area corresponding to the area to be cropped set in the first frame of the video, the crop area movement determination unit 120 may fix the area to be cropped, which has been set in the first frame, in a second frame subsequent to the first frame.

Figure 2B:
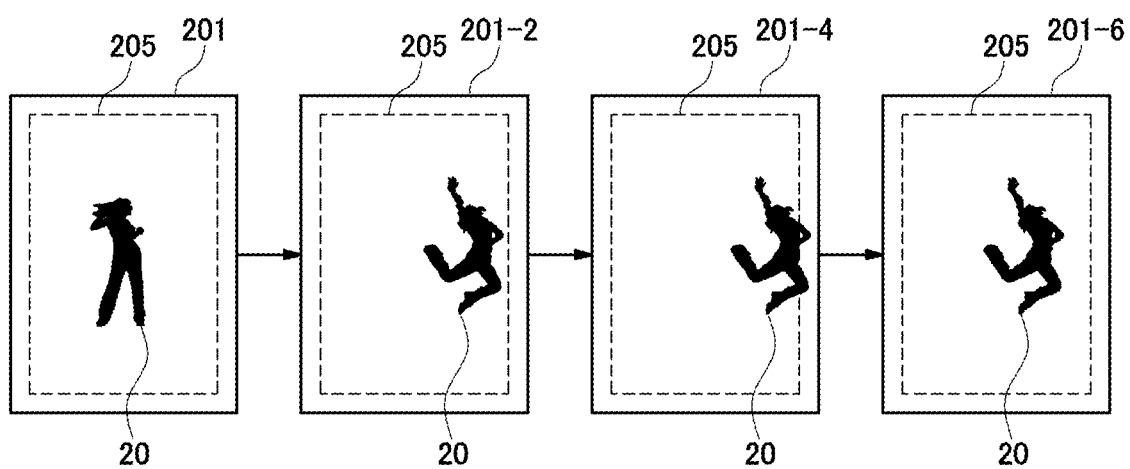

Referring to FIG. 2B, if the coordinate information of the object 20 tracked in the second frame 201-2, which is the frame subsequent to the first frame 201, is included in the first critical area corresponding to a crop area 205 set in the first frame 201 of the video, the crop area movement determination unit 120 may fix the crop area 205, which has been set in the first frame 201, in the second frame 201-2. That is, if the object 20 tracked in the second frame 201-2 moves within the first critical area corresponding to the area to be cropped 205, the angle of view (i.e., the area to be cropped 205) is fixed to make the user feel comfortable when watching the object 20.

If the coordinate information of the tracked object exceeds the first critical area but the coordinate information of at least a part of the tracked object falls within the crop area, the crop area movement determination unit 120 may be used. Exceeding the first critical area may be determined by comparing the coordination information of the tracked object and the coordinate information of the area to be cropped. The comparison may include comparing the coordinate information of a corner of an area to be cropped with a coordinate information of one or more pixels of the tracked object. For example, if at least one pixel of the tracked object having a coordinate information correspond to the coordinate information of at least one pixel of the area to be cropped, the tracked object is at least partially falls within the area to be cropped. If all the pixel of the tracked object having a coordinate information correspond to the coordinate information of at least a subset of pixels of the area to be cropped, the tracked object completely falls within the cropped area. The crop area movement determination unit 120 may move the crop area, which has been set in the first frame, in the second frame subsequent to the first frame by a predetermined movement amount. For example, the predetermined amount may be five pixels, a number of pixel corresponding to a percentage of the number of pixels in one direction of the area to be cropped or the object, etc. Referring to FIG. 2B, if coordinate information of the object 20 tracked in a third frame 201-4 exceeds the first critical area corresponding to the area to be cropped 205 but the coordinate information of at least a part of the tracked object 20 falls within the area to be cropped 205, the crop area movement determination unit 120 may move the area to be cropped 205, which has been set in the first frame 201, in a fourth frame 201-6 subsequent to the third frame 201-4 by a predetermined movement amount. That is, if at least a part of the object 20 tracked in the third frame 201-4 exceeds the first critical area corresponding to the area to be cropped 205, the area to be cropped 205 is moved by a predetermined number of pixels amount from the fourth frame 201-6 subsequent to the third frame 201-4 in a direction in which the coordinate information of the tracked object 20 is moved in order for the angle of view to be located in the middle of the video. Therefore, it is possible to extract a video that looks natural as if it were taken by the user himself/herself.

Figure 2C:
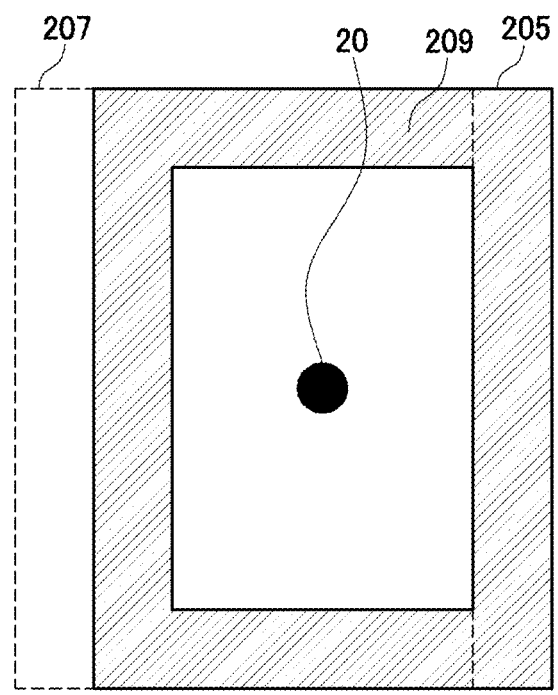
Figure 2D:
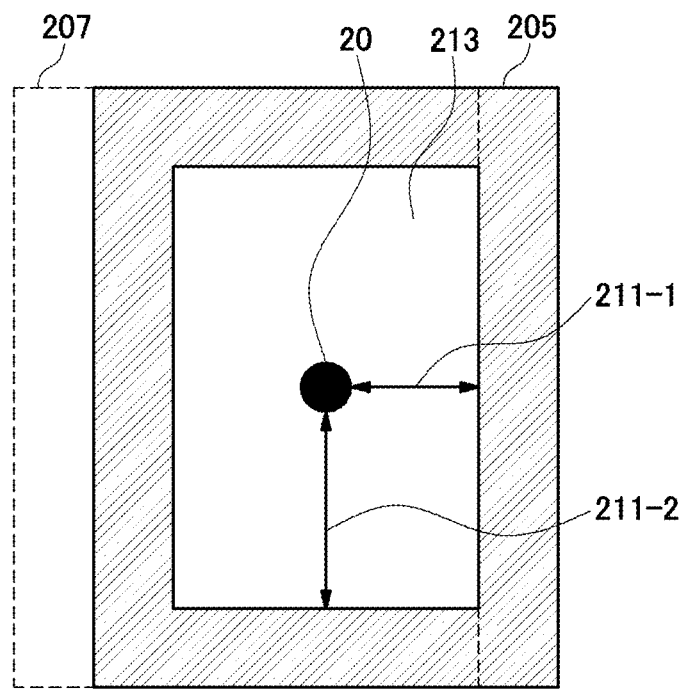

Referring to FIG. 2C and FIG. 2D, coordinate information 207 of the object 20 tracked in the video by a tracking process TrackingROl is defined as (center_x, center_y), coordinate information of the area to be cropped 205 set in a frame is defined as (rectangle_x, rectangle_y) and a hatched portion 209 refers to an area where a video frame is moved by the first critical area corresponding to the crop area, and a range in which the object can move is set as a critical value. In this case, an area where a camera frame is not moved is set as a blank portion 213.

If the object moves and |rectangle_x−center_x| becomes greater than a first critical value 211-1, the crop area 205 is moved by a predetermined movement amount set in a frame along an X-axis direction and if |rectangle_y−center_y| becomes greater than a second critical value 211-2, the crop area 205 is moved by a predetermined movement amount set in a frame along a Y-axis direction to make natural frame movements. That is, if the object 20 moves up, down and sideways, it is possible to enable the camera to take a video as if the camera naturally moved with the object 20.

The extraction unit 130 may extract, from the video, a partial video corresponding to the crop area that is moved or not according to a result of the determination based on location relation between the coordinate information of the tracked object and the crop area.

Figure 3A:
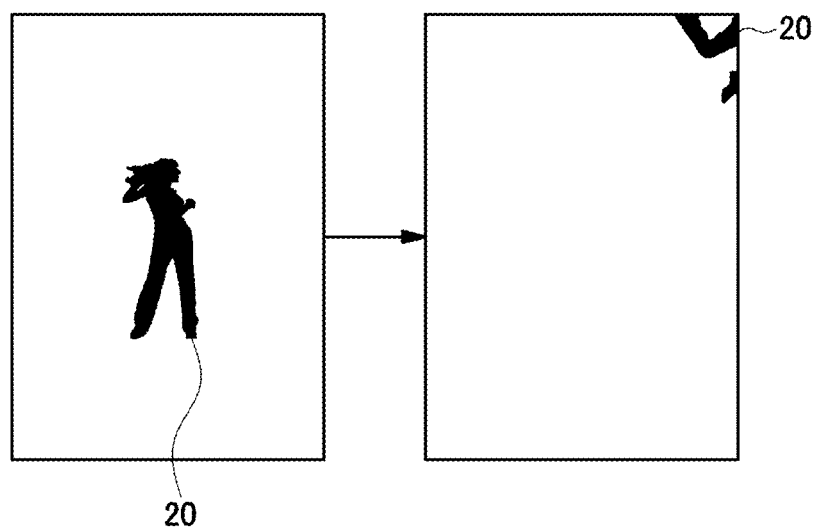
FIG. 3A through FIG. 3G are example depictions to explain a method for processing an area to be cropped depending on an error in an object tracking process, in accordance with various embodiments described herein.
Figure 3B:
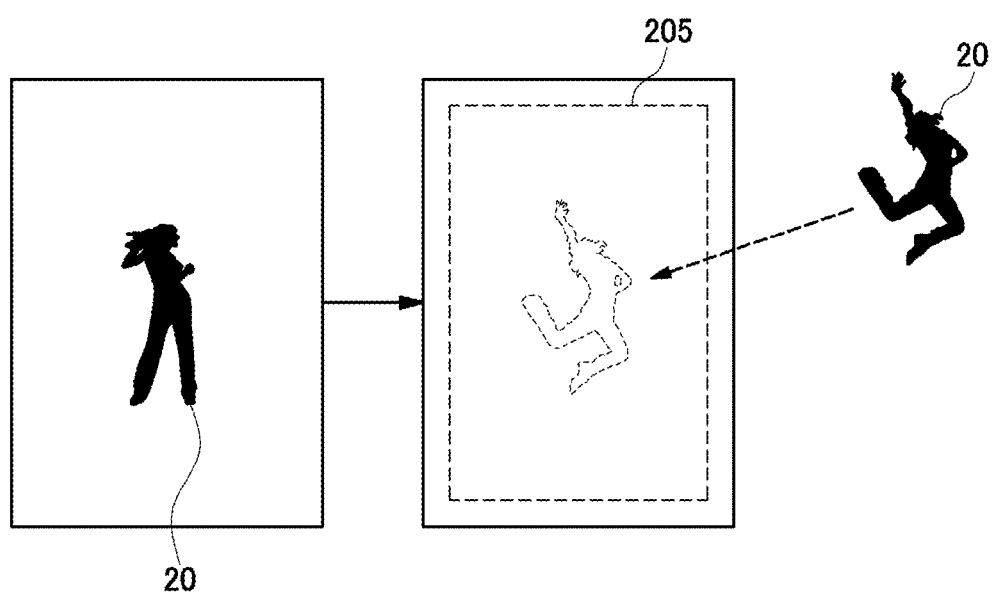

Meanwhile, if a temporary error occurs while the object is tracked in the video, the frame suddenly jumps to a wrong frame and a partial video corresponding to the wrong frame is extracted (see FIG. 3A). A temporary error may include the tracked object 20 is totally out of the crop area 205 that none of the pixel coordinate of the tracked object 20 overlap with the pixel coordinate of the crop area 205. To solve this problem, if the tracked object 20 is totally out of the crop area 205 when adjacent frames among a plurality of frames of the video are compared with each other, the crop area movement determination unit 120 may recognize a tracking process for the object 20 as having an error and maintain the crop area 205 (see FIG. 3B). Then, the crop area movement determination unit 120 may wait until the tracking process recognizes the object 20 again.

Hereafter, a process for re-tracking the object 20 when object tracking is failed due to an error in the tracking process will be described in detail. For example, object tracking is failed if the coordinate information of at least one pixel of the tracked object does not correspond to the coordinate information of at least one pixel of the critical area.

Figure 3C:
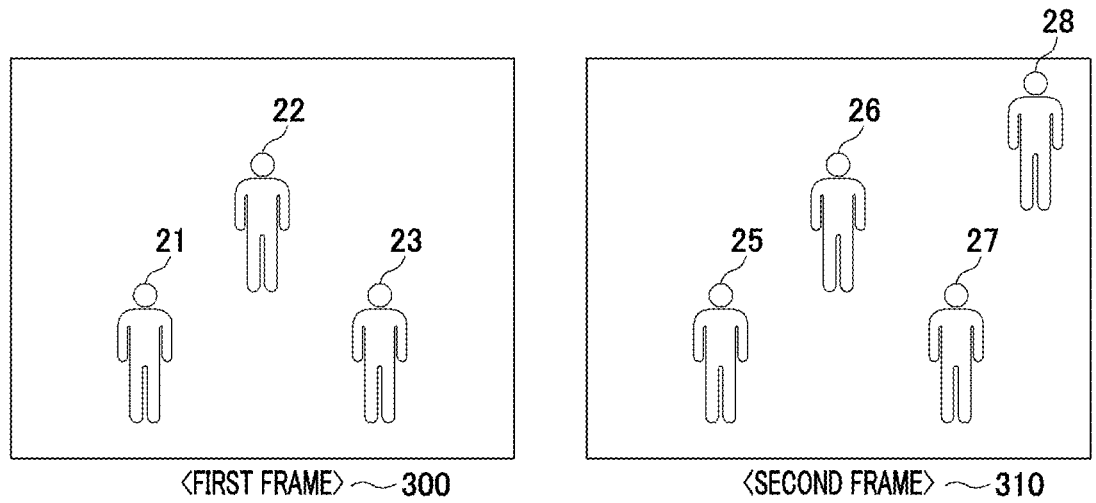

Referring to FIG. 3C, the tracking unit 100 may add a new object to a to-be-tracked object list based on whether first objects 21, 22 and 23 included in a first frame 300 are the same as second objects 25, 26 and 27 included in a second frame 310.

For example, the tracking unit 100 may compare the first objects 21, 22 and 23 included in the to-be-tracked object list generated by reflecting to the first frame 300 with second objects 25, 26, 27 and 28 detected from the second frame 310 and determine whether they are the same objects.

If it is determined that the first objects 21, 22 and 23 are not the same as the second objects 25, 26, 27 and 28, the tracking unit 100 may assign new identifiers to the second objects 25, 26, 27 and 28 and add the second objects 25, 26, 27 and 28, as new objects, to the to-be-tracked object list.

For example, the tracking unit 100 may determine that "the first object-A 21 is the same as the second object-A 25", "the first object-B 22 is the same as the second object-B 26" and "the first object-C 23 is the same as the second object-C 27" based on the to-be-tracked object list generated by reflecting to the first frame 300.

However, "the second object-D 28" is not included in the first frame 300 including the first objects 21, 22 and 23. Thus, the tracking unit 100 may determine that the second object-D 28 is not the same object, but a new object appearing from the second frame 310 and assign a new identifier to the second object-D 28 and add it to the to-be-tracked object list.

Figure 3D:
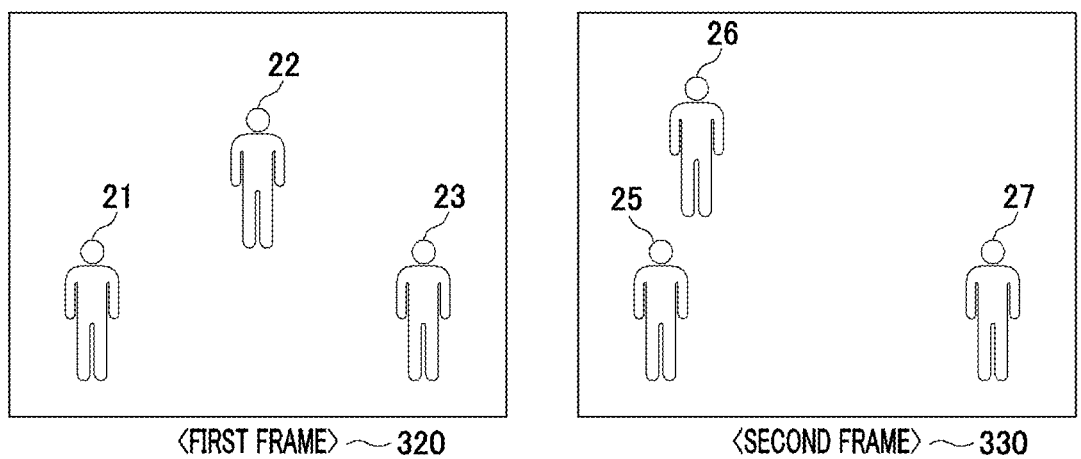

Referring to FIG. 3D, the tracking unit 100 may compare the first objects 21, 22 and 23 included in a to-be-tracked object list generated by reflecting to a first frame 320 with the second objects 25, 26 and 27 detected from a second frame 330 and if the same objects as the first objects 21, 22 and 23 are not detected from the second frame 330, the tracking unit 100 may determine that object tracking of first objects 25, 26 and 27 has been failed in the second frame 330.

For example, the tracking unit 100 may determine that "the first object-A 21 is the same as the second object-A 25" and "the first object-C 23 is the same as the second object-C 27" based on the to-be-tracked object list generated by reflecting to the first frame 320.

However, if the position of the second object B-26 which is the same as the first object-B 22 is moved in the second frame 330 and the second object-B 26 is occluded by the second object-A 25, the tracking unit 100 cannot detect the second object-B 26.

When the tracking unit 100 cannot detect the same object as the first object-B 22 from the second frame 330, the tracking unit 100 may determine that object tracking of first object-B 22 has been failed in the second frame 330.

Figure 3E:
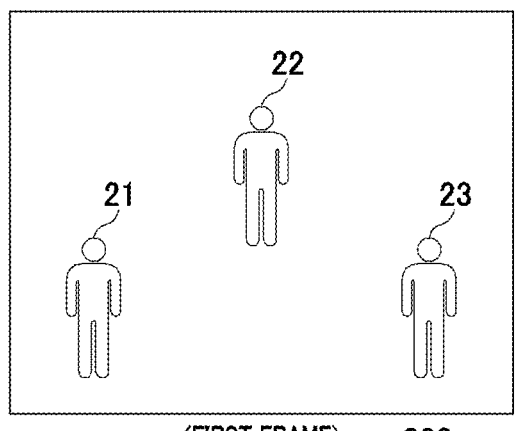
Figure 3E:
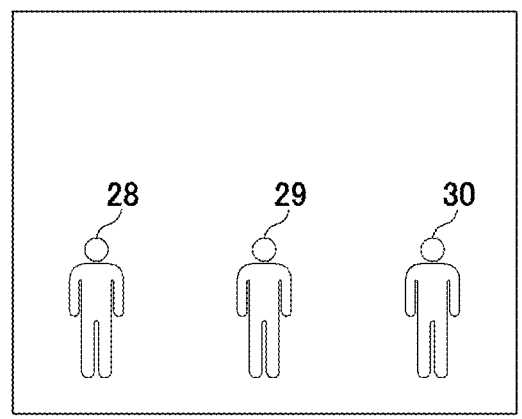

Referring to FIG. 3E, if object tracking has been failed as shown in FIG. 3D, the tracking unit 100 may calculate similarities (Mean Squared Errors (MSEs)) among motion vectors of the first objects 21, 22 and 23 in the first frame 320 and at least one of third objects 28, 29 and 30 detected from a third frame 340 subsequent to the second frame 330.

Here, the third frame 340 may be a next frame (n+1th frame) of the current frame (nth frame), but is not limited thereto. A value of flag may be set to "true" to calculate the MSEs among the motion vectors of the first objects 21, 22 and 23 in the first frame 320 and at least one of the third objects 28, 29 and 30 detected from the third frame 340.

The tracking unit 100 may determine any one of the third objects 28, 29 and 30 as a to-be-retracked object based on the calculated MSEs and assign an identifier of the first objects 21, 22 and 23 to the to-be-retracked object. In this case, the tracking unit 100 may determine, as a to-be-retracked object, any one of the third objects with the highest MSE.

For example, the tracking unit 100 may determine, as a to-be-retracked object, the third object-B 29 with the highest MSE among the third objects 28, 29 and 30 based on the calculated MSEs, assign the identifier of the first object-B 22 to the third object-B 29, which has been determined as the to-be-retracked object, and update the to-be-tracked object list.

Here, if a to-be-retracked object cannot be determined by calculating the MSEs, the tracking unit 100 may determine a to-be-retracked object by calculating an MSE among motion vectors of at least one of fourth objects detected from a fourth frame subsequent to the third frame 340.

Here, if flags for extracting motion vectors from respective body parts of an object are set, the tracking unit 100 may determine a to-be-retracked object by calculating an MSE among the motion vectors of the respective body parts of the object.

The tracking unit 100 may retrack an object based on the updated to-be-tracked object list.

Figure 3F:
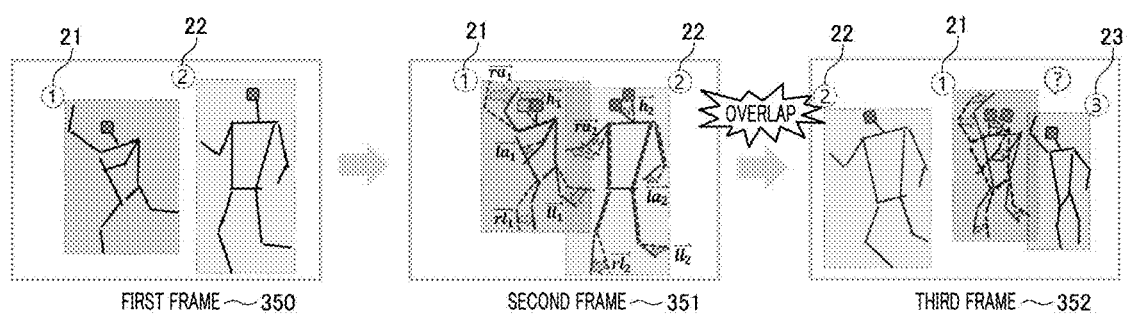

Referring to FIG. 3F, if it is not possible to determine a to-be-retracked object by comparing MSEs among motion vectors at 3D center coordinates of objects and video data correspond to target data set for extracting motion vectors from respective body parts, the tracking unit 100 may compare MSEs among the motion vectors of the respective body parts of the objects.

For example, the tracking unit 100 may extract the coordinate information of a plurality of objects, each representing a body part of a person being tracked in a video as the tracked objects (for example, coordinate information and length information of body parts such as arms, legs, trunk and head) of a first object 21 and a second object 22 by pose estimation from a first frame 350 (n−1th frame).

Then, the tracking unit 100 may update a list of coordinate information of body parts as the first object 21 and the second object 22 move in a second frame 351 (nth frame).

The tracking unit 100 may calculate motion vectors of the respective body parts of the first object 21 and the second object 22 based on the updated coordinate information of body parts.

Thereafter, if the first object 21 and the second object 22 overlap with each other and the tracking unit 100 cannot determine a to-be-retracked object by comparing MSEs among motion vectors at 3D center coordinates between the first object 21 and the second object 22 in a third frame 352 (n+1th frame), the tracking unit 100 may calculate MSEs among motion vectors of respective body parts of the first object 21 detected from the first frame 350 and a third object 23 detected from the third frame 352 (n+1th frame) and determine, as a to-be-retracked object, the third object 23 with a high MSE among the motion vectors of the respective body parts. Here, the tracking unit 100 may assign the identifier of the first object 21 to the third object 23.

Figure 3G:
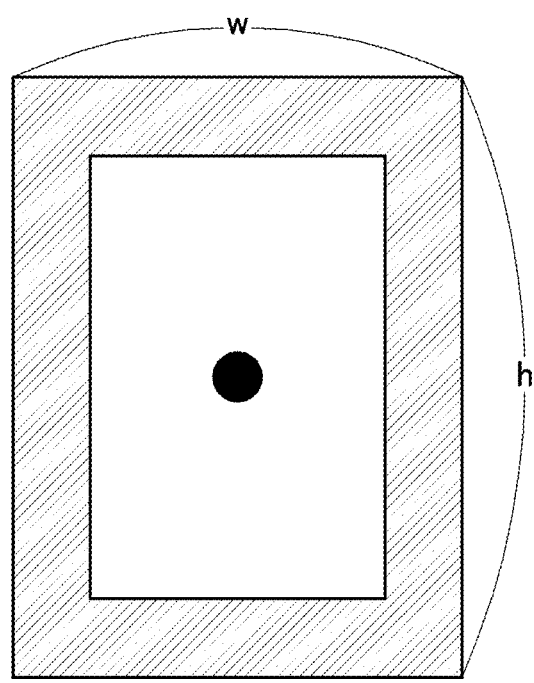

Referring to FIG. 3G, when coordinate information (center_x, center_y) of the object 20 tracked from adjacent frames is compared with coordinate information (rectangle_x, rectangle_y) of the crop area 205, if coordinate information of the object 20 tracked from any one of the frames is out of a width w and a height h of the crop area 205 (i.e., rectangle_x−center_x>=w or rectangle_y−center_y>=h), it is recognized as an error in the tracking process and the crop area 205 is not adjusted. Accordingly, it is possible to suppress the occurrence of an error of suddenly displaying another frame in a partial video extracted by correction.

Even a high-performance tracking process may not accurately measure an area included in an object from a video For example, even when the full body of a person is designated, only a part of the body may be tracked or a partial area around the person may be tracked from each frame.

Figure 4A:
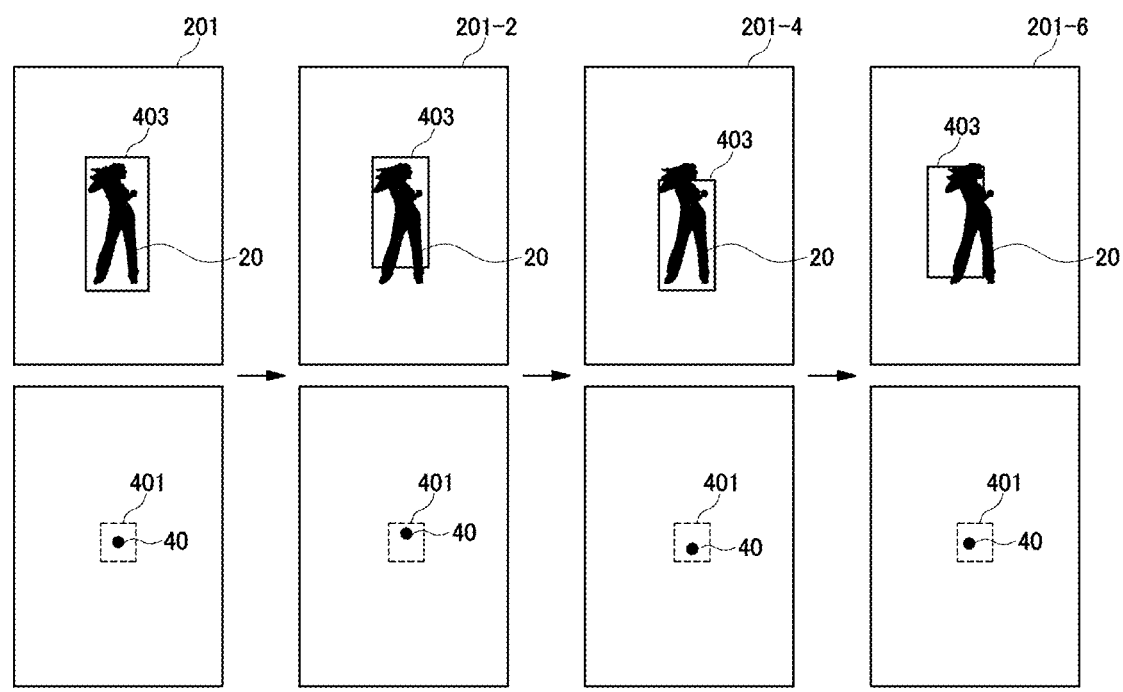
FIG. 4A and FIG. 4B are example depictions to explain a method for correcting jitter of an object based on a second critical area, in accordance with various embodiments described herein.
Figure 4B:
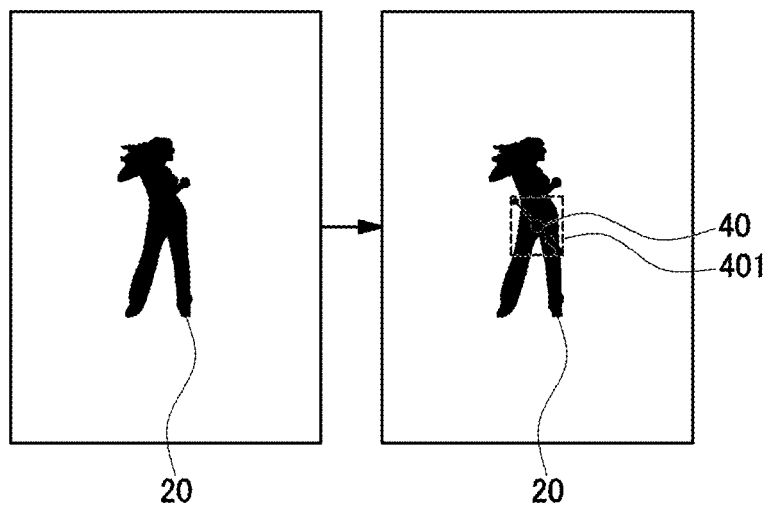

Referring to FIG. 4A and FIG. 4B, in a plurality of adjacent frames 201, 201-2, 201-4 and 201-6, if the object 20 does not move or slightly moves, it can be seen that a rectangular area 403 of the tracking process is gradually changed and coordinates of a central point of the object 20 are changed in each frame. Therefore, if a video is extracted by a conventional crop method, screen jitter occurs. The jitter can be solved by correction with a second critical area 401 for a central point 40 of the tracked object 20.

Specifically, the jitter correction unit 140 may set the second critical area 401 for the central point 40 of the tracked object 20 and correct jitter of the object based on the second critical area 401.

The jitter correction unit 140 may correct the central point 40 of the object 20 based on whether the central point 40 of the tracked object 20 is located within the second critical area 401. In other words, if the central point 40 of the object 20 tracked in the plurality of frames 201, 201-2, 201-4 and 201-6 is located within the second critical area 401, the jitter correction unit 140 may correct the central point 40 of the tracked object 20 not to move and thus maintain the crop area.

Figure 5A:
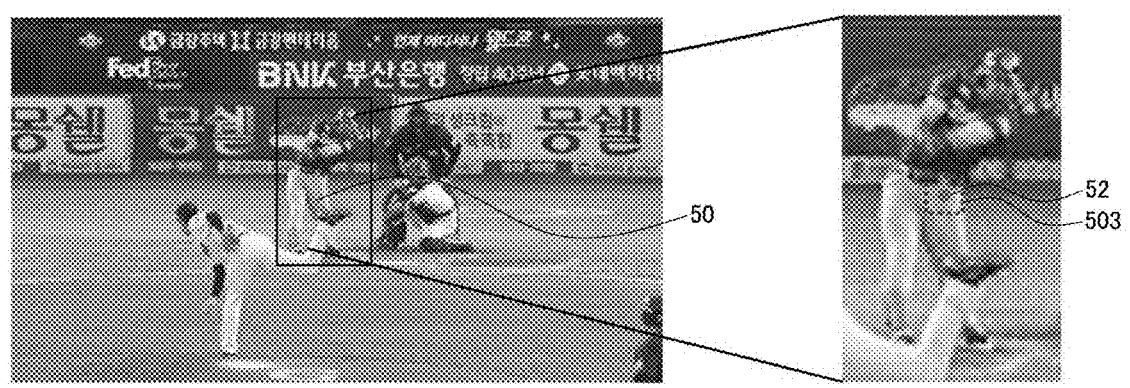
FIG. 5A through FIG. 5C are example depictions to explain an object extraction method, in accordance with various embodiments described herein.
Figure 5B:
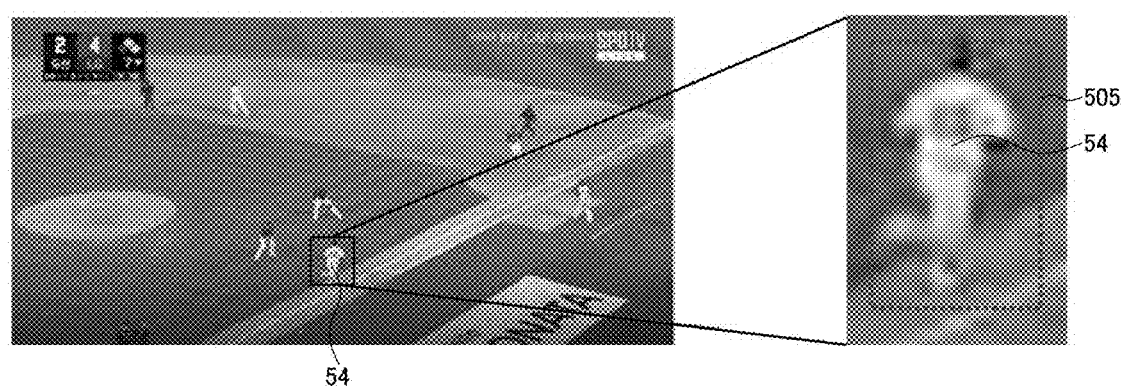

The present disclosure can be applied to a sport video. As shown in FIG. 5A, if a first player 50 is not moving (for example, in a batter's box), the jitter correction unit 140 may correct jitter of the first player 50 based on a second critical area 504 for a central point 52 of the first player 50. As shown in FIG. 5B, if a second player 54 is moving (for example, going to first base) in the sports video, the extraction unit 130 may apply a first critical area corresponding to an area to be cropped 505 of the second player 54 to extract and generate a partial video looking natural.

Figure 5C:
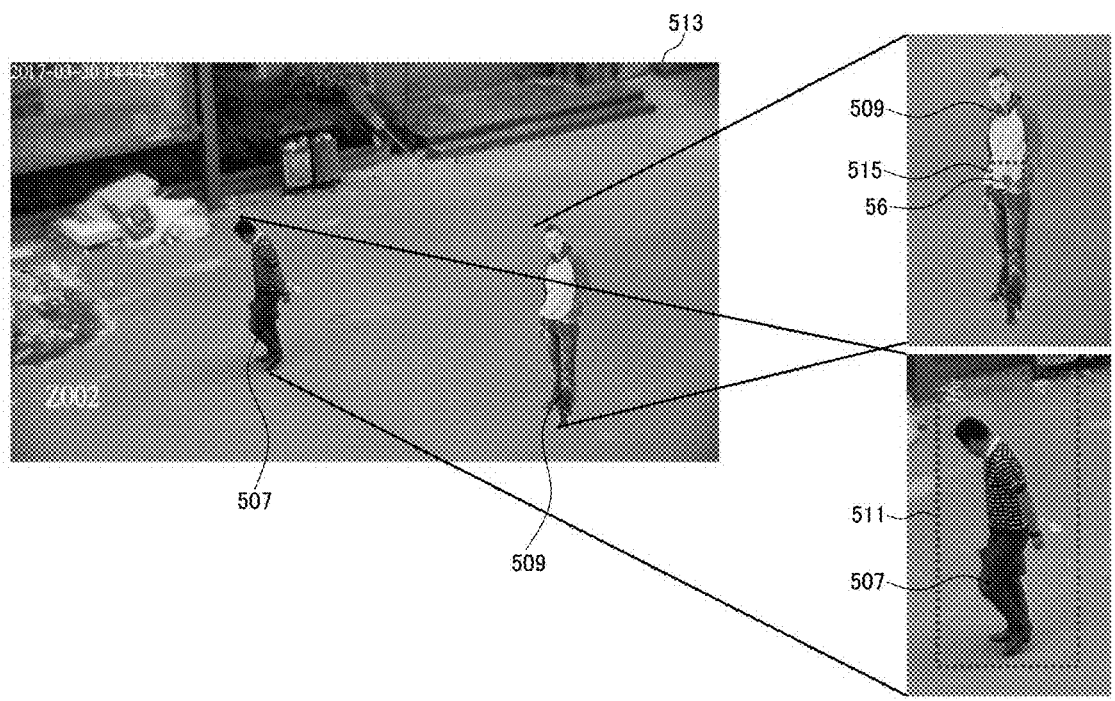

The present disclosure can be applied to a closed-circuit television (CCTV). The CCTV takes videos and stores the videos. In many cases, an area of interest is cropped and only a specific portion is stored. Even in this case, CCTV videos may be stored after being classified into those with a moving object and those without a moving object for easy analysis afterwards. Referring to FIG. 5C, the storage unit 150 may apply a first critical area corresponding to an area to be cropped 511 to a first object 507 that is moving in a CCTV video 513 and extract the first object 507 and store the first object 507 in a first database. Also, the storage unit 150 may correct jitter of a second object 509 that is not moving in the CCTV video 513 based on a second critical area 515 for a central point 56 of the second object 509 and store the second object 509 in a second database.

Meanwhile, it would be understood by a person with ordinary skill in the art that each of the tracking unit 100, the crop area setting unit 110, the crop area movement determination unit 120, the extraction unit 130, the jitter correction unit 140 and the storage unit 150 can be implemented separately or in combination with one another.

Figure 6:
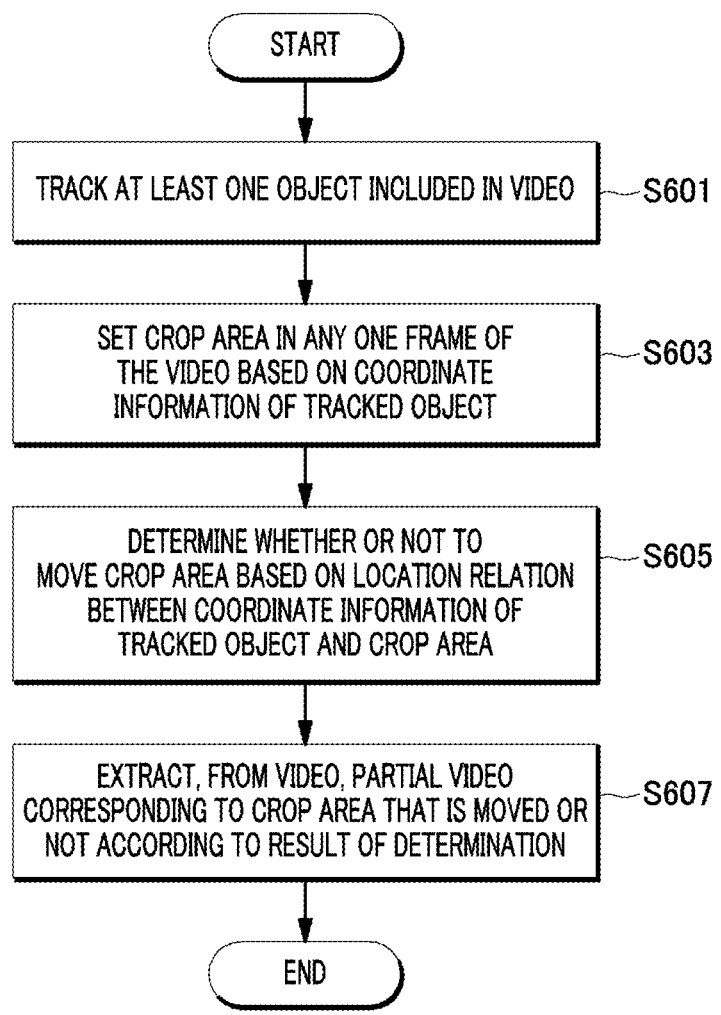
FIG. 6 is a flowchart illustrating an example processing flow for extracting an object from a video, in accordance with various embodiments described herein.

FIG. 6 is a flowchart illustrating an example processing flow for extracting an object from a video, in accordance with various embodiments described herein.

Referring to FIG. 6, in process S601, the object extraction device 10 may track at least one object included in a video.

In process S603, the object extraction device 10 may set an area to be cropped in any one frame of the video based on coordinate information of the tracked object.

In process S605, the object extraction device 10 may determine whether or not to move the crop area based on a location relation between the coordinate information of the tracked object and the crop area.

In process S607, the object extraction device 10 may extract, from the video, a partial video corresponding to the crop area that is moved or not according to a result of the determination.

Although not illustrated in FIG. 6, in process S605, if the coordinate information of the tracked object is included in a first critical area corresponding to an area to be cropped set in a first frame of the video, the object extraction device 10 may fix the crop area, which has been set in the first frame, in a second frame subsequent to the first frame.

Although not illustrated in FIG. 6, in process S605, if the coordinate information of the tracked object exceeds the first critical area corresponding to the crop area but the coordinate information of at least a part of the tracked object falls within the crop area, the object extraction device 10 may move the crop area, which has been set in the first frame, in the second frame by a predetermined movement amount.

Although not illustrated in FIG. 6, in process S605, if the tracked object is out of the crop area when adjacent frames among a plurality of frames of the video are compared with each other, the object extraction device 10 may recognize a tracking process for the object as having an error and maintain the crop area.

Although not illustrated in FIG. 6, after process S605, the object extraction device 10 may set the second critical area for a central point of the tracked object and correct jitter of the object based on the second critical area. Specifically, the object extraction device 10 may correct the central point of the object based on whether the central point of the tracked object is located within the second critical area.

In the descriptions above, processes S601 through S607 may be divided into additional processes or combined into fewer processes depending on the embodiment. In addition, some of the processes may be omitted and the sequence of the processes may be changed if necessary.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An object extraction device for extracting an object from a video, comprising:
   a tracking unit that tracks at least one object included in the video;
   a crop area setting unit that sets a crop area in any one frame of the video based on coordinate information of the tracked object;
   a crop area movement determination unit that determines whether or not to move the crop area based on a location relation between the coordinate information of the tracked object and the crop area, by:
      comparing the coordinate information of the tracked object in a first frame of the video and a first critical area corresponding to the crop area set in the first frame, the first critical area being smaller than the crop area, and
      fixing the crop area in a second frame subsequent to the first frame if the coordinate information of the tracked object is included in the first critical area; and
   an extraction unit that extracts, from the video, a partial video corresponding to the crop area that is moved or not according to a result of the determination.

2. The object extraction device of claim 1 wherein if the coordinate information of the tracked object exceeds the first critical area but the coordinate information of at least a part of the tracked object falls within the crop area, the crop area movement determination unit moves the crop area, which has been set in the first frame, in the second frame by a predetermined movement amount.

3. The object extraction device of claim 2, further comprising:
   a jitter correction unit that sets a second critical area for a central point of the tracked object and corrects jitter of the object based on the second critical area.

4. The object extraction device of claim 3,
   wherein the jitter correction unit corrects the central point of the object based on whether the central point of the tracked object is located within the second critical area.

5. An object extraction device for extracting an object from a video, comprising:
   a tracking unit that tracks at least one object included in the video;
   crop area setting unit that sets a crop area in any one frame of the video based on coordinate information of the tracked object;
   a crop area movement determination unit that determines whether or not to move the crop area baaed on a location relation between the coordinate information of the tracked object nod the crop area; and
   an extraction unit that extracts, from the video, a partial video corresponding to the crop area that is moved or not according to a result of the determination,
   wherein if the tracked object is out of the crop area when adjacent frames among a plurality of frames of the video are compared with each other, the crop area movement determination unit maintains the crop area.

6. An object extraction method for extracting an object from a video, comprising:
   a process of tracking at least one object included in the video;
   a process of setting a crop area in any one frame of the video based on coordinate information of the tracked object;
   a process of determining whether or not to move the crop area based on a location relation between the coordinate information of the tracked object and the crop area; and
   a process of extracting, from the video, a partial video corresponding to the crop area that is moved or not according to a result of the determination, and
   wherein the determining of whether or not to move the crop area includes:
      comparing the coordinate information of the tracked object in a first frame of the video and a first critical area corresponding to the crop area set in the first frame, the first critical area being smaller than the crop area
      fixing the crop area in a second frame subsequent to the first frame if the coordinate information of the tracked object is included in the first critical area.

7. The object extraction method of claim 6,
   wherein in the process of determining whether or not to move the crop area,
   if the coordinate information of the tracked object exceeds the first critical area but the coordinate information of at least a part of the tracked object falls within the crop area, the crop area which has been set in the first frame is moved in the second frame by a predetermined movement amount.

8. The object extraction method of claim 6,
   wherein in the process of determining whether or not to move the crop area,
   if the tracked object is out of the crop area when adjacent frames among a plurality of frames of the video are compared with each other, the crop area is maintained.

9. The object extraction method of claim 8, further comprising:
   a process of setting a second critical area for a central point of the tracked object and correcting jitter of the object based on the second critical area.

10. The object extraction method of claim 9,
    wherein in the process of correcting jitter of the object, the central point of the object based on whether the central point of the tracked object is located within the second critical area.

11. A non-transitory readable medium storing a computer program and including a sequence of instructions for extracting an object from a video, wherein, when the computer program is executed, the instructions cause a computing device to:
    track at least one object included in the video;
    set a crop area in any one frame of the video based on coordinate information of the tracked object;

determine whether or not to move the crop area based on a location relation between the coordinate information of the tracked object and the crop area by:
  comparing the coordinate information of the tracked object in a first frame of the video and a first critical area corresponding to the crop area set in the first frame, the first critical area being smaller than the crop area, and
  fixing the crop area in a second frame subsequent to the first frame if the coordinate information of the tracked object is included in the first critical area; and
extract, from the video, a partial video corresponding to the crop area that is moved or not according to a result of the determination.

\* \* \* \* \*